United States Patent [19]

Verduyn

[11] 4,454,033
[45] Jun. 12, 1984

[54] FILTERING APPARATUS

[76] Inventor: Norbertus Verduyn, Bankastraat 11, 3818 CG Amersfoort, Netherlands

[21] Appl. No.: 420,912

[22] Filed: Sep. 21, 1982

[30] Foreign Application Priority Data

Sep. 29, 1981 [NL] Netherlands ............... 8104453

[51] Int. Cl.³ ............................................ B01D 23/24
[52] U.S. Cl. ................................. 210/108; 210/264; 210/277; 210/333.1
[58] Field of Search ............... 210/109, 264, 269, 273, 210/275, 276, 277, 333.1, 500.1, 505, 508, 509, 108

[56] References Cited

U.S. PATENT DOCUMENTS

| 2,173,060 | 9/1939 | Andrews | 210/333.1 |
| 2,302,450 | 11/1942 | Laughlin | 210/264 |
| 3,246,767 | 4/1966 | Pall et al. | 210/505 |

Primary Examiner—Ivars C. Cintins
Attorney, Agent, or Firm—Laubscher, Philpitt & Laubscher

[57] ABSTRACT

Apparatus for continuous filtration of a fluid, for example water containing solids, comprising a plurality of filter cells partially filled with mobile filtering material, each cell having an inlet and an outlet, means being provided for continuously supplying fluid to the inlets, a drain element for filtered solids being connectible to a limited number of cell inlets without interrupting the fluid supply to the other cell inlets, the drain element lowering the fluid supply pressure prevailing at the limited number of cell inlets to a value lower than the filtrate pressure prevailing at the cell outlets so that these cells are backwashed with filtrate such that the mobile filtering material only partially filling the cells is swirled in the turbulent filtrate flow within the cells and is thoroughly cleaned from adhering solids.

6 Claims, 2 Drawing Figures

FILTERING APPARATUS

BACKGROUND OF THE INVENTION

The invention relates to a continuous filtering apparatus, capable of being cleaned without interruption of the filtering process.

BRIEF DESCRIPTION OF THE PRIOR ART

U.S. Pat. No. 2,173,060 discloses such a filtering apparatus, comprising a plurality of filter cells, each having an inlet and an outlet, the inlets communicating with a common supply for fluid to be filtered, the outlets communicating with a common filtrate drain, the filter further comprising a drain element for filtered material, the drain element being movable along the cell inlets and being connectible to a limited number of cell inlets without interrupting the fluid supply to the other cell inlets.

The mode of operation of this known apparatus is such that a fluid to be filtered is supplied to the inlets and filtrate is drained from the filter cells, the pressure prevailing at the inlets being higher than the pressure at the outlets. For cleaning this filtering apparatus while in operation, a part of the filter cell inlets is periodically isolated from the other filter cell inlets and the pressure at this inlet or these inlets is temporarily reduced to a value lower than the pressure prevailing at the outlets, so that in the relevant filter cell or filter cells the direction of flow is reversed and these cells are backwashed with filtrate. Therefore the filtering process does not need to be interrupted for the cleaning of the apparatus.

In the known apparatus the filter cells consist of little tubes made of a filtering medium, which tubes extend radially from a central inlet channel for fluid to be filtered. Therefore the available filtering area is relatively small, consisting only of the inner walls of the filter tubes facing the inlet side of the cells. Dependent on the nature of the solids filtered out of the fluid supplied to the apparatus, a filter cake may be formed on the said inner walls of the little filter tubes, which cake may clog the filter pipes in a relatively short time.

Such deficiencies are substantially avoided by using a bed or layer of mobile auxiliary filtering material. It is an object of the present invention to provide a filtering apparatus which in the same manner as the apparatus according to U.S. Pat. No. 2,173,060, can be cleaned continuously, wherein, however, use is made of a bed or layer of mobile filtering material in each cell, for example, but not limited thereto, a mass of loose, granular filtering material such as sand, and wherein the filtering material containing cells may be thoroughly cleaned in a very short time.

SUMMARY OF THE INVENTION

According to the invention an apparatus for continuous filtration of a fluid having the features stated in the foregoing referring to U.S. Pat. No. 2,173,060, is characterized in that the cell outlets and the cell inlets are arranged on different levels and the cells are partially filled with filtering material of a mobile nature.

Therefore when the inlets are on a higher level than the related outlets, there will be in each filter cell an empty space over the filtering material in said cell, which makes it possible for the filtering material to be brought in a swirling movement when during backwashing filtrate flows upwardly from the outlet to the inlet in the cell, which swirling movement provides for a fast release of collected solids from the filtering material.

In a structurally simple and reliable embodiment with large filtering capacity, the filtering apparatus which, as known per se from the U.S. Pat. No. 2,173,060, comprises a tubular structure of filter cells arranged around an axial passage, the cell inlets being arranged at the axial passage which is a part of the supply passage for fluid to be filtered and the drain element for filtered material being constructed as a piston with a hollow piston rod, the piston being movable along successive filter cell inlets and then connecting these inlets selectively through one or more circumferential openings in the piston with the hollow piston rod which acts as a drain passage for filtered material and which is characterized in that the filter cells have a substantially truncated-conical shape, with the inlets at the narrower upper ends.

For cleaning of such successive annular filter cells it is thus sufficient to only activate the piston which then performs one or more strokes through the tubular passage.

The filter cells may be formed by stacking cup-shaped elements with spacers.

In case backwashing of a filter cell containing a layer of loose granular filtering material is done with too much force, it is possible that the desired cleaning swirling of the filtering material cannot occur because the filtering material is pressed as a compact mass against the inlet end of the relevant cell. To avoid this, a control valve can be mounted in the drain trajectory for filtered material, which control valve limits the flow when a predetermined flow rate is exceeded.

In further elaboration of the invention the mobile auxiliary filtering material in the cells may be formed by a mass of threads, each one of which is locally connected to a filtrate-pervious holding layer, arranged between the inlet and the outlet of each cell.

During filtering, the threads lie folded onto and over each other, pressed against the holding layer and thus form a filtering bed. During backwashing the threads are stretched by the backflowing filtrate and will wave or flutter in the swirling filtrate flow. They are cleaned effectively in a short time and it needs only a relatively weak backflow to accomplish this.

In case the solid material to be filtered out of the fluid is relatively dense, a heavy filter cake will accumulate on the filtering bed. During backwashing it takes a rather large amount of energy just to lift this heavy material and move it upwardly to a higher positioned inlet. Under such circumstances it may be preferable to have the inlets of the cells on a lower level than the outlets. The normal filtrate flow in each cell will pass upwardly and the solids will be pressed against the underside of the filtering bed. During backwashing gravity cooperates to loosen the solids from the filtering bed and the backwashflow is more fully used for cleaning the bed itself, and for washing the mass of threads. Therefore it takes only a small amount of filtrate.

BRIEF DESCRIPTION OF THE FIGURES

The embodiments of the filtering apparatus in accordance with the present invention will now be described, by way of example, and with reference to the accompanying drawings, in which.

DETAILED DESCRIPTION

Figure 1:
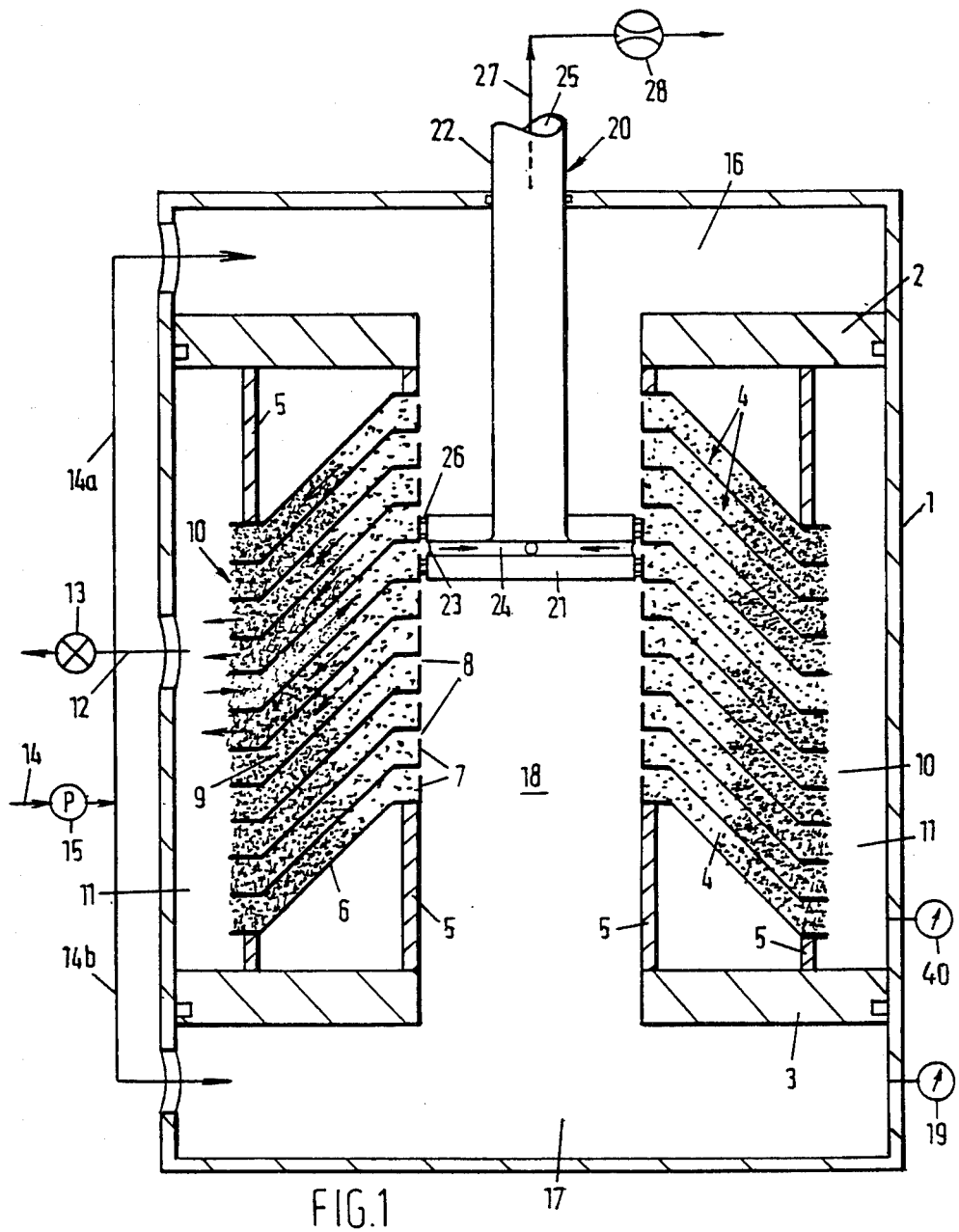
FIG. 1 is a longitudinally sectioned view of a first embodiment of the filtering apparatus according to the invention.

According to FIG. 1, a tubular column of axially stacked annular filter cells 4 is fixed within a casing 1 between an upper end plate 2 and a lower end plate 3, by means of a number of supports 5. The filter cells 4 may be obtained by stacking a number of identical cup-shaped elements 6 with a cylindrical inner end edge 7, such that between successive inner edges 7, filter cell inlets 8 remain open. The spaces between successive cups 6 are partially filled with filtering material 9. The axial spacing of the cups 6 is realized in any desired manner, for example by making use of perforated spaces and/or filtering material having self-supporting characteristics.

At the radially outer sides of the filter cells 4 there are outlets 10, opening in a common filtrate accumulating space 11, to which a drain line 12 and a throttle valve 13, both indicated only schematically, are connected.

In the shown embodiment the supply of fluid to be filtered, for example dirty water, is formed by a supply line 14 with a pump 15, branch lines 14a and 14b, which open into an upper chamber 16 and a lower chamber 17, respectively. The central passage 18 of the column of filter cells 4 opens at both ends in the chambers 16, 17 respectively.

The filtrate pressure in the accumulating space 11 may be measured with a gauge 40 and the pressure in the supply circuit 14, 15, 16, 17 may be measured with a gauge 19.

The continuous filtering apparatus comprises a drain element 20 for filtered material. Element 20 comprises a piston 21 and a hollow piston rod 22. Piston 21 has at its circumference one or a plurality of entrances 23 which through passage 24 communicate with the bore 25 of the piston rod 22. Piston 21 further comprises seals 26 cooperating with the inner edges 7 of the successive cups 6.

Drain element 20 further comprises a drive means (not shown) to move piston 21 through passage 18.

The mode of operation of the continuous filtering apparatus is substantially as follows:

During normal operation of the filter, piston 21 is for example positioned on the same level as the upper end wall 2 and fluid to be filtered is supplied by pump 15 through lines 14 and 14b to the lower chamber 17 and passage 18. The supply pressure is registered at gauge 19. The fluid flows through passage 18 into the inlets 8 of the filter cells 4 and filtrate flows out of the outlets 10 into accumulating space 11, from which it is drained through line 12. By means of the throttle valve 13, the pressure in the accumulating place 11 can be maintained at a certain value, which is lower than the supply pressure of pump 15. The pressure in space 11 is registrated by gauge 40.

As soon as the difference between the pressures, measured at the gauges 19 and 40, exceeds a predetermined value, which during normal operation is an indication of a certain amount of clogging of the filter material 9, the drive means of the drain element 20 is activated and piston 21 moves downwardly through passage 18. During this downward movement of the piston the entrance 23 on the circumference of the piston are successively connected to the inlets of successive filter cells 4 and the seals 26 isolate such connection from the passage 18 over and under the position of the piston. Each time when the piston is positioned in front of a certain filter cell inlet 8, the pressure prevailing at that inlet is the pressure of the drain trajectory 27 through drain element 20. At the outlet 10 of that cell the lower pressure of the filtrate in the accumulating space 11 is still prevailing and due to this pressure difference there is in that particular cell a radially inwardly directed filtrate flow which flushes the cell and takes with it the released earlier filtered out solids through drain trajectory 27. During this backwashing of a cell the normal filtering flow is maintained in the rest of the cells 4, going outwardly. By movement of the piston 21 to the next cell 4, the flow direction in this cell is reversed, while in the foregoing recently cleaned cell the radially outwardly directed filtering flow is reinstated.

As soon as the piston 21 and its downward movement has passed the upper filter cell 4, this cell is being supplied with filter to be filtered through branch line 14a and upper chamber 16.

The drive of the drain element 20 may be continuous, so that the filtering apparatus is continuously cleaned by means of a slowly up and down moving piston. On the other hand, the piston may remain in a rest position until a certain amount of clogging is registered, after which the movement of drain element 20 is initiated.

By having the cells 4 only partially filled with granular filtering material, this material is able to swirl during backwashing and is quickly and thoroughly cleaned. Under these circumstances it is possible that due to high pressure differences the backwash flow of filtrate through one or a limited number of cells is too forceful to allow the desired cleaning swirling. In order to limit this backflow, the drain trajectory 27 may comprise a valve 28 which as long as the flow rate in trajectory 27 does not exceed a certain value, may be fully opened.

Figure 2:
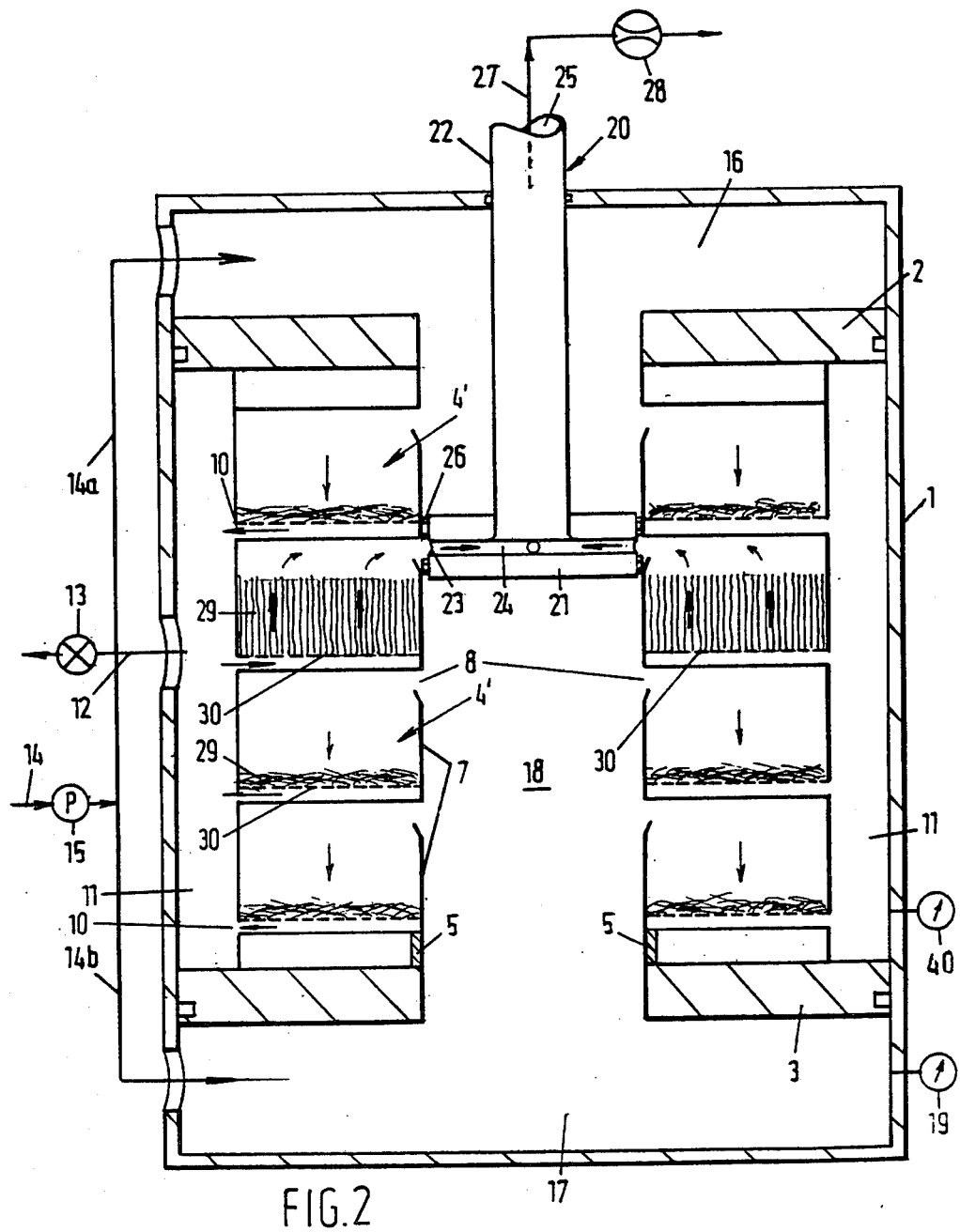
FIG. 2 is a view according to FIG. 1 of a second embodiment.

In the embodiment according to FIG. 2 there are provided in the filter cells 4' between inlet 8 and outlet 10, masses of threads 29, each of which is fixed with one end to a holding layer 30, which is pervious to filtrate. During filtering the threads 29 form a filter bed on layer 30 and during backwashing they are stretched and flutter in the filtrate flow.

It is understood that the invention is not limited to the described embodiments. Basically, it is possible that the entrance 23 of piston 21 covers more than one cell inlet 8 at the same time. Further it is possible to have the inlets of the filter cells at the radially outer side of the stack, while the outlet is positioned in the central passage of an annular stack. The filter column does not have to be positioned within a casing 1. It is possible for a column to be self-supporting and provided with covered outlets 10, which are however communicating with each other and wherein the supply is directly connected to the central passage 18. It is further possible to have the drain element 20 stationary, while the stack of filter elements is axially movable. Using loose granular filtering material this can be confined within the cells between spacer rings (not shown) between the cups 6, which rings are pervious to the fluid to be filtered, and which may be positioned at the inlets 8, at the outlets 10 and if desired in between, in which case the cells 4 are divided in annular compartments, each with its own filling of filtering material. It is further possible to have the outlets of the filter cells on a higher level than the respective inlets. Under circumstances it may be desirable to use a suction pump for backwashing, such a pump connected to the bore 25 of drain element 20.

I claim:

1. A fluid filtration device, comprising
   (a) a plurality of filter cells arranged in vertically stacked relation, each of said cells including a fluid inlet opening and a filtered fluid outlet opening vertically offset relative to said inlet opening;
   (b) mobile filtering material arranged within and partially filling each of said filter cells;
   (c) means for delivering fluid to be filtered to said inlet openings;
   (d) filtrate drain means for receiving filtered fluid from said outlet openings; and
   (e) drain element means for removing filtered material from said filter cells, said drain element means being displaced relative to said filter cells for connection with a limited number of said inlet openings without interrupting the delivery of fluid to the remaining cell inlet openings, whereby filtered material may be removed from a limited number of said filter cells while the remaining filter cells simultaneously filter the fluid.

2. Apparatus as defined in claim 1, and further comprising control valve means connected with said drain element means, said control valve means being operable to close said drain element means when the flow of filtered material from said filter cells exceeds a predetermined flow rate.

3. Apparatus as defined in claim 1, wherein said mobile filtering material comprises
   (1) an elongated layer of holding material pervious to the filtered fluid and extending continuously between said inlet and outlet openings; and
   (2) a plurality of threads connected with said layer of holding material.

4. Apparatus as defined in claim 3, wherein the inlet opening of each of said cells is arranged at a lower elevation than the associated outlet opening of each of said cells, respectively.

5. A fluid filtration device, comprising
   (a) a plurality of filter cells arranged in a vertically stacked tubular configuration and defining an axial passage, each of said filter cells including a fluid inlet opening communicating with said axial passage and a filtered fluid outlet opening, each of said filter cells having a truncated conical configuration with the inlet opening of each of said cells being elevated relative to the associated outlet opening, respectively;
   (b) mobile filtering material arranged within and partially filling each of said filter cells;
   (c) means for delivering fluid to be filtered to said axial passage for introduction into said filter cell inlet openings, whereby said fluid flows radially outwardly through said filter cells and said outlet openings;
   (d) filtrate drain means for receiving filtered fluid from said outlet openings; and
   (e) drain element means for removing filtered material from said filter cells, said drain element means including
      (1) a generally horizontal piston member arranged within said axial passage, said piston member including at least one radial passage terminating at a circumferential opening adapted for connection with at least one of said inlet openings; and
      (2) an axially arranged piston rod connected with said piston member and containing a longitudinal passage communicating with said piston radial passage, said piston member being vertically displaced relative to said filter cells to connect said at least one piston circumferential opening with at least one of said inlet openings without interrupting the delivery of fluid to the remaining cell inlet openings, whereby filtered material may be removed from at least one of said filter cells while the remaining filter cells simultaneously filter the fluid.

6. Apparatus as defined in claim 5, and further comprising control valve means connected with said drain element means, said control valve means being operable to close said drain element when the flow of filtered material from said filter cells exceeds a predetermined flow rate.

* * * * *

UNITED STATES PATENT AND TRADEMARK OFFICE
CERTIFICATE OF CORRECTION

PATENT NO. : 4,454,033

DATED : June 12, 1984

INVENTOR(S) : Norbertus Verduyn

It is certified that error appears in the above—identified patent and that said Letters Patent is hereby corrected as shown below:

In the heading, please insert:

--Assignee: Norbertus Wouter Hendrik Verduyn,
Amersfoort, the Netherlands --

Signed and Sealed this

Fourth Day of December 1984

[SEAL]

*Attest:*

*Attesting Officer*

GERALD J. MOSSINGHOFF

*Commissioner of Patents and Trademarks*